United States Patent

[11] 3,570,510

| [72] | Inventor | Teruo Tsutsumi<br>Yokohama-shi, Japan |
|---|---|---|
| [21] | Appl. No. | 726,424 |
| [22] | Filed | May 3, 1968 |
| [45] | Patented | Mar. 16, 1971 |
| [73] | Assignee | Ishikawajima-Harima Jukogyo Kabushiki Kaisha<br>Tokyo-to, Japan |
| [32] | Priority | June 30, 1967 |
| [33] | | Japan |
| [31] | | 42/42104 |

[54] SELF-CLEANING VALVE AND METHOD THEREFOR
3 Claims, 4 Drawing Figs.

[52] U.S. Cl. .................................................. 137/15, 137/240
[51] Int. Cl. ................................................. F16l 45/00
[50] Field of Search........................................... 137/240, 15, 239, 237, 238

[56] References Cited
UNITED STATES PATENTS

| 3,075,539 | 1/1963 | Yoder ........................ | 137/240 |
| 3,145,930 | 8/1964 | Herklotz.................... | 137/240UX |
| 1,235,409 | 7/1917 | Aldrich ..................... | 137/240 |
| 1,802,205 | 4/1931 | Fox ............................ | 137/240 |
| 1,899,154 | 2/1933 | Karrick ...................... | 137/240X |
| 2,907,342 | 10/1959 | Berg........................... | 137/240X |
| 3,035,598 | 5/1962 | McInerney ................. | 137/240 |
| 3,307,573 | 3/1967 | Epstein...................... | 137/240 |

FOREIGN PATENTS

| 927,664 | 5/1955 | Germany.................... | 137/238 |

*Primary Examiner*—Clarence R. Gordon
*Attorney*—Nolte and Nolte

ABSTRACT: A method of cleaning a valve seat and a valve device suitable for application of said method, wherein clean fluid such as gas, air, water and the like, is supplied to the valve seat of the valve device from a circular space having an annular slit so as to keep the valve seat clean.

Patented March 16, 1971

INVENTOR
TERUO TSUTSUMI

BY *Nolte & Nolte*

ATTORNEYS

Patented March 16, 1971

INVENTOR
TERUO TSUTSUMI

BY *Nolte & Nolte*

ATTORNEYS

SELF-CLEANING VALVE AND METHOD THEREFOR

FIELD OF THE INVENTION

This invention relates to valve devices suitable for regulating the flow of fluids, such as gases and liquids, specifically to valve devices suitable to stop selectively the flow of fluids therethrough.

A number of valve devices of various constructions are known and used for the above purpose. All of these conventional devices have the disadvantage that, in instances where the fluid flowing through the valve contains sticky dust particles or the like, the valve or rather the valve seat starts to collect such dust particles, which prevents proper closing of the valve.

SUMMARY OF THE INVENTION

It is a primary object of the present invention to avoid the above drawback and to present an improved valve device and a method of cleaning the valve seat of the device.

In particular it is an object of the present invention to provide a method and an apparatus which will make it possible to keep the valve seat of a valve device free from dust particles and the like even when the fluid flowing through said valve is contaminated with such dust particles or the like.

It is a further object of the invention to make it possible to clean the valve seat of a valve device during the operation thereof.

Also, it is an object of the invention to provide a valve which will not leak due to contamination of the valve seat with sticky dust particles and the like.

This is being achieved by a controlled flow of a cleaning fluid arranged to clean the valve seat while the valve is in operation.

In a preferred embodiment of the invention the valve comprises a valve box with a valve head having circular sidewalls defining the opening of the valve. A tubular space is provided on the periphery of said sidewalls which is connected to an annular opening or slit defined by two concentric seat rings. A valve body swivably movable within the valve box between an open and a closed position is equipped with a circular resilient seat facing the two concentric seat rings and forming with the sealing surfaces of the seal rings the actual seal of the valve seat when the valve body is in a closed position.

While the valve is in the open position a cleaning fluid introduced under pressure into said tubular space is continuously escaping through the annular slit, defined by said two concentric rings, thereby constantly cleaning the annular slit and portions of the two seat rings and keeping them free from contamination due to contact with the fluid flowing through the valve.

During the closing operation of the valve not only the slit and the sealing surfaces of the two seat rings are cleaned, but also the circular resilient seat of the valve body as it approaches the two seat rings defining the annular slit.

To improve the operation of the valve, means may be provided to let the cleaning fluid escape from the annular slit during the open position of the valve at a speed sufficient to keep the slit free from contamination and to considerably increase the speed of the cleaning fluid during the closing movement of the valve body just shortly before the sealing surfaces of the concentric seat rings meet with the resilient seat and thus to clean all surfaces forming the seal of the valve by the cleaning fluid now escaping from the annular slit at increased speed.

BRIEF DESCRIPTION OF DRAWINGS

In order that the present invention may be readily carried into effect, it will now be described with reference to the accompanying drawing in which.

DESCRIPTION OF THE PREFERRED EMBODIMENT

Figure 1:
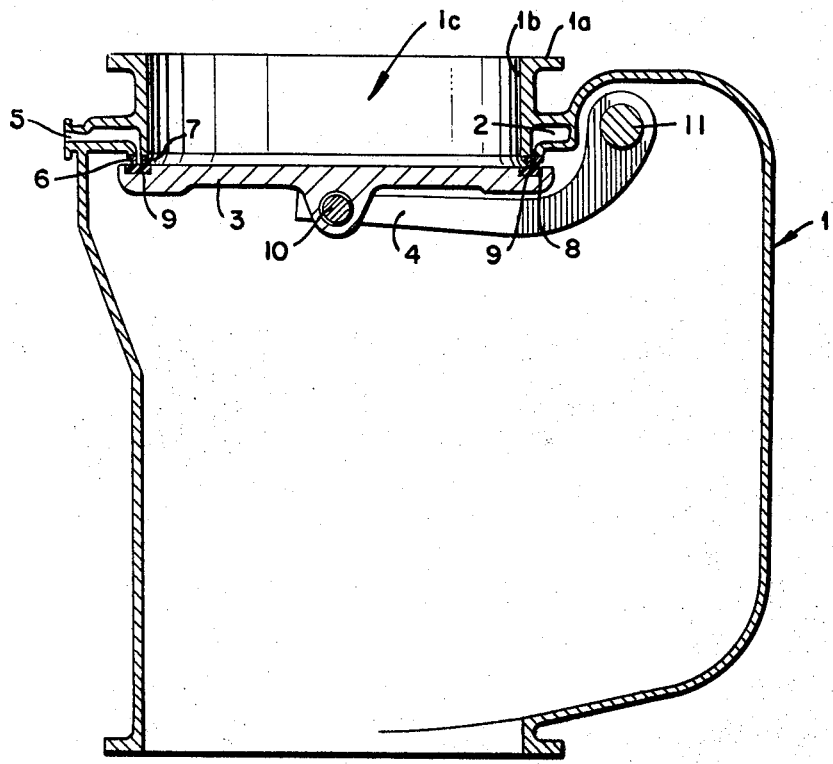
FIG. 1 is a sectional side elevation of the valve in closed position.
Figure 2:
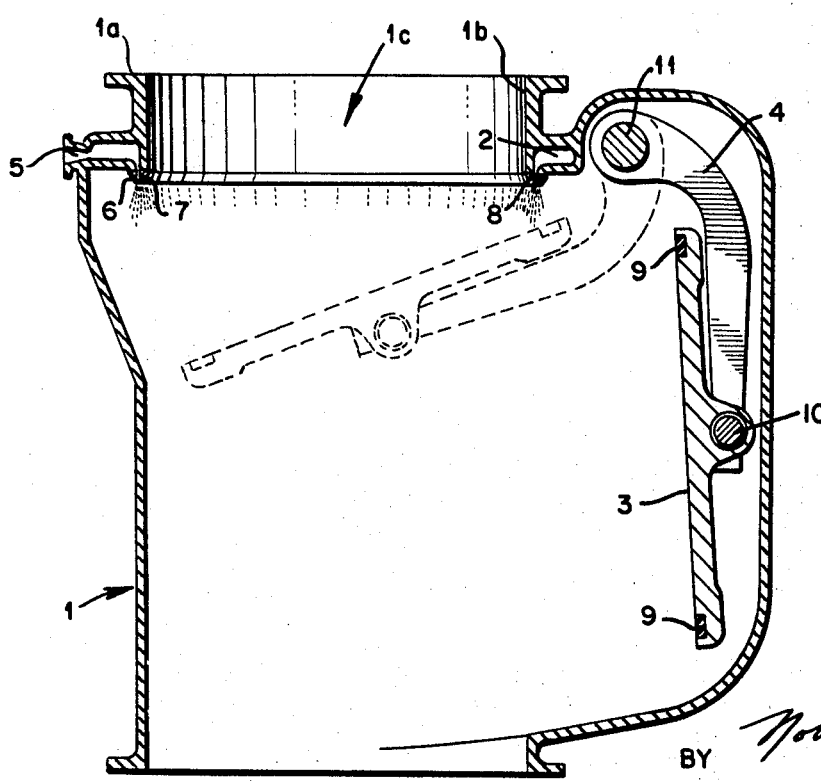
FIG. 2 is a sectional side elevation of the valve in open position.

The valve represented in FIG. 1 and FIG. 2 comprises a valve box or housing having a cylindrical head portion 1a with sidewalls 1b defining a valve opening 1c. A tubular space 2 is provided on the periphery of the cylindrical head portion 1a, and is equipped with an inlet opening 5. Two concentric seat rings 6 and 7 are disposed on the inner edge of the cylindrical head portion 1a and are coaxial therewith, said seal rings defining an annular slit 8 connected to the tubular space 2 and forming an outlet therefrom.

A valve body movable between a closed and an open position is disposed inside of the valve box or housing 1 and swivably attached thereto by means of an arm 4. A resilient circular seal 9 located in the valve body is coaxial with said seat rings 6 and 7 when said valve body is in the closed position and forms together with the sealing surfaces of the seal rings the actual seal of the valve. The seal rings 6 and 7 as well as the circular seal 9 may be arranged to be individually removable for replacement if they are worn or damaged. One end of the arm 4 is attached to the valve box 1 by means of a spindle 11 and is swivable thereabout. The other end of the arm 4 carries a spindle 10 for swivably attaching the valve body 3, thereby facilitating a tight seal of the circular seat of the valve body against the sealing surfaces of the seal rings in the head portion of the valve box.

Figure 3:
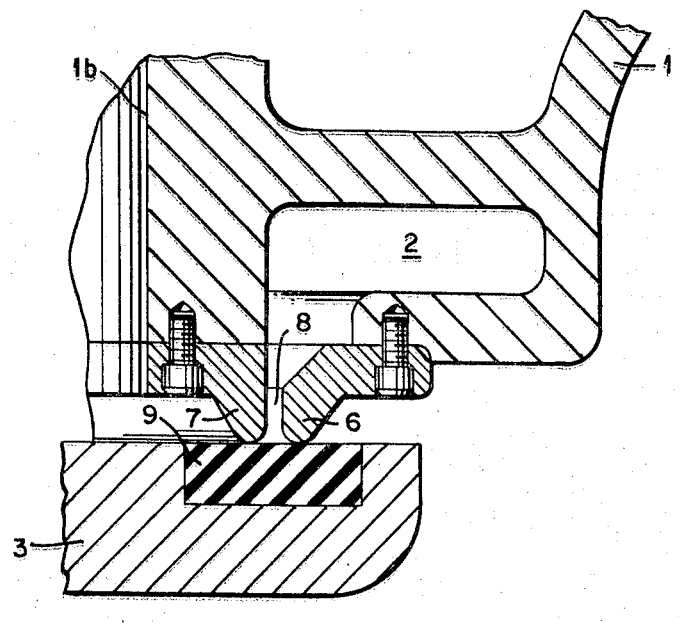
FIG. 3 is a sectional view in an enlarged scale of the sealing surfaces of the valve in closed position.

FIG. 3 shows an enlarged scale view of the relative position of the sealing surfaces of the seal rings 6 and 7 and the circular seal 9. The seal rings are being shown in their particular embodiment to be removable from the inner edge of the valve head. Also shown is the tubular space 2 and the outlet therefrom namely slit 8 defined by the inner walls of the two seat rings 6 and 7.

Figure 4:
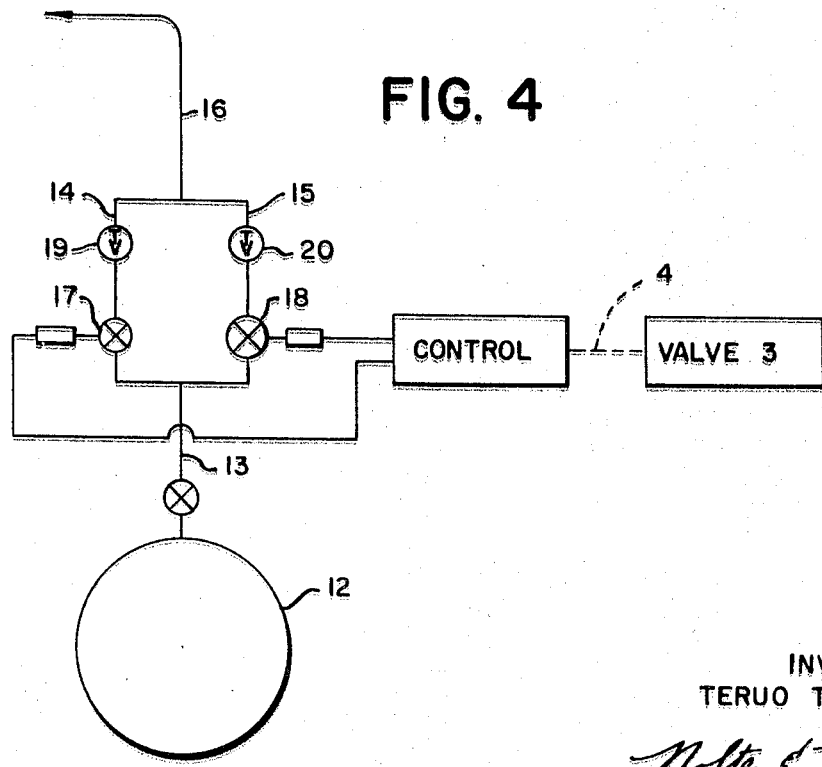
FIG. 4 is a diagrammatic illustration of the arrangement for supply of the cleaning fluid and of the control system therefor.

The arrangements for the supply of the cleaning fluid to the inlet 5 of the tubular space 2 and for the control thereof is best seen in the diagram in FIG. 4.

A container 12 suitable for storing a cleaning fluid like clean gas under pressure is connected to pipe 13 which serves as outlet of the container. Pipe 13 is bifurcated into pipes 14 and 15, the former 14 being provided with a small piston valve 17 and a throttle valve 19 and the latter 15 with a large piston valve 18 and a throttle valve 20, respectively, and the pipe 16 coupling said pipes 14 and 15 is related to the inlet 5 for compressed gas in order that the compressed clean gas stored in the clean gas receiver 12 is led first through the pipe 13, then bifurcated by the pipes 14 and 15, and rejoin through said pipe 16 to reach said inlet 5 for the tubular space 2. Further, the opening and closing movement of the piston valves 17 and 18 are automatically interlocked with the opening and closing movement of the valve body 3 so that, when the valve body 3 is in closed position, the small piston valve 17 and the large piston valve 18 are also closed, whereas while the valve body 3 is in open position the small piston valve 17 opens alone and just before the valve body 3 comes in closed position the both piston valves 17 and 18 are opened.

The operation of the device according to the invention will be explained as follows:

The small piston valve 17 is first opened simultaneously with the opening of the valve body 3 in order to lead the compressed clean gas through the pipes 13, 14, 16 and the gas inlet 5 to the tubular space 2. Clean gas will escape through the slit 8 at a certain velocity for instance 10 m/sec., which will be sufficient to prevent slit 8 to be contaminated with dust or the like contained in the fluid moving through the valve.

After the valve body 3 started its closing movement the large piston valve 18 is opened automatically and compressed clean gas is supplied into the tubular space 2 at a higher rate and escapes through the slit at a considerably higher velocity for instance 100 m/sec. to sweep the seal rings 6 and 7 and the rubber seal 9 so that the sealing surfaces are free from contamination at the time when they join to form the seal of the valve and to intercept any flow through the valve of fluid which might be contaminated. As soon as the valve body has completed its closing movement and is in the closed position the piston valves 17 and 18 are automatically closed. Thus it is possible to keep the sealing surfaces of the valve free from contamination by dust or the like even if the valve is used in connection with fluids which are contaminated.

A further advantage of the invention is that due to its simplicity it can be realized at very low cost.

Although the explanation has been made referring to the FIGS., wherein the device has the structure that closing and opening of the valve is carried out by rotating the valve body 3, it is within the concept and spirit of the present invention to apply it to a valve which is closed and opened by moving the valve body 3 axially or transversally. Further, it is possible to switch the velocity of the gas escaping from said slit 8 from a low to a high level by changing the stroke of the opening and closing of a single, instead of two, piston valve provided in the device. It is possible to maintain the velocity of the gas escaping from the slit 8 at a constant all times, adopting a single piston valve structure and keeping at a certain value the stroke of the opening and closing of said valve. Further, the compressed clean gas may be replaced by clean air, water, etc. according to the kind of fluid passing through the valve box.

While the invention has been described by means of specific embodiments, I do not wish to be limited thereto, for obvious modifications will occur to those skilled in the art without departing from the spirit of the invention.

I claim:

1. A valve device comprising a valve housing having a head portion defining an opening of the valve device; a valve body disposed in said valve housing and movable between an open and a closed position, said valve body closing said opening when in said closed position; a first resilient seal disposed on one side of said valve body; a second stationary seal disposed on the periphery of said head portion to meet said first seal when said valve body is in a closed position, said second seal being two concentric rings with a relatively narrow space therebetween defining an annular slit; a chamber in said valve housing for storing cleaning fluids under pressure; said storage chamber being located above said annular slit and connected thereto; and control means to control the pressurized flow of said cleaning fluid from said storage chamber to said annular slit to permit the escape of said pressurized fluid downwardly through said annular slit, said cleaning fluid maintaining said annular slit and said first and second seals free from contamination as it escapes through said annular slit.

2. A valve device comprising a valve housing having a head portion defining an opening of the valve device; a valve body disposed in said valve housing and movable between an open and a closed position, said valve body closing said opening when in said closed position; a first resilient seal disposed on one side of said valve body; a second stationary seal disposed on the periphery of said head portion to meet said first seal when said valve body is in a closed position, said second seal defining an annular slit, storage means in said valve housing for storing cleaning fluid under pressure; said storage means being located above said annular slit and connected thereto, a control means for controlling the pressurized flow of said cleansing fluid from said storage means to said annular slit comprising a first pipe one end of which is the outlet of the storage means, a second and third pipe forming a pair of bifurcated pipes connected to the other end of said first pipe, a fourth pipe, said second and third pipes being connected to one end of said fourth pipe, the other end of said fourth pipe leading to said annular slit, said control means further comprising a first set of valves including a piston valve and a throttle valve for control of the flow of the cleaning fluid through one of the pipes of said pair and a second set of valves including a larger piston valve and a throttle valve for control of the flow of the cleaning fluid through the other pipe of said pair, said first set of valves being operatively connected to said valve body for controlling the flow of said cleaning fluid when said valve body is in its open position and said second set of valves being operative to increase the flow of said fluid when the valve body is approaching its closed position.

3. A process for keeping a valve device, having a movable valve body, free from contamination due to contact with contaminated fluids comprising storing a cleaning fluid in a pressurized storage means; moving the cleaning fluid from the storage means to a tubular space in the head portion of the valve in synchronization with the opening and closing movement of the valve body and permitting the pressurized cleaning fluid to escape downwardly through said tubular space in the direction of the sealing surfaces of the valve while the valve body is in an open position and during the closing movement of the valve body to keep the escape passage and the sealing surfaces of the valve free from contamination, the movement of the cleaning fluid being synchronized with the opening and closing movement of said valve body permitting the pressurized flow of the cleaning fluid to said head portion at a predetermined velocity for cleaning of the escape passages while the valve body is in its open position and at a greater velocity for cleaning of the sealing surfaces when the valve body approaches its closed position.